United States Patent
Bracht et al.

(10) Patent No.: US 12,015,624 B2
(45) Date of Patent: Jun. 18, 2024

(54) AUTOMATED DETECTION OF NETWORK SECURITY ANOMALIES USING A DENOISING DIFFUSION PROBABILISTIC MODEL

(71) Applicant: MOTOROLA SOLUTIONS, INC., Chicago, IL (US)

(72) Inventors: Eamon Bracht, La Grange, IL (US); Cyril Jazra, Champaign, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 223 days.

(21) Appl. No.: 17/530,255

(22) Filed: Nov. 18, 2021

(65) Prior Publication Data
US 2023/0156025 A1    May 18, 2023

(51) Int. Cl.
*H04L 9/40* (2022.01)
*G06F 18/214* (2023.01)
*G06N 3/04* (2023.01)
*H04L 41/22* (2022.01)

(52) U.S. Cl.
CPC ........ *H04L 63/1425* (2013.01); *G06F 18/214* (2023.01); *G06N 3/04* (2013.01); *H04L 41/22* (2013.01); *H04L 63/1416* (2013.01); *H04L 63/145* (2013.01)

(58) Field of Classification Search
CPC ............. H04L 63/1425; H04L 63/1416; H04L 63/145; H04L 41/22; G06F 18/214; G06N 3/04
See application file for complete search history.

(56) References Cited

U.S. PATENT DOCUMENTS

| 9,088,598 | B1 * | 7/2015 | Zhang ................. H04L 63/1408 |
| 9,367,683 | B2 | 6/2016 | Kolacinski et al. |
| 10,956,808 | B1 | 3/2021 | Bhardwaj et al. |

(Continued)

OTHER PUBLICATIONS

Zhang, C et al., "Zipnet-gan: Inferring fine-grained mobile traffic patterns via a generative adversarial neural network," Proceedings of the 13th International Conference on emerging Networking Experiments and Technologies, ACM (2017).

(Continued)

*Primary Examiner* — Thaddeus J Plecha
(74) *Attorney, Agent, or Firm* — Michael Best & Friedrich LLP

(57) ABSTRACT

Systems and methods for detecting and scoring security anomalies in a computing environment. One system includes a communication interface and an electronic processor. The electronic processor is configured to receive, via the communication interface, a network traffic event for the computing environment, parse the network traffic event to extract a feature set describing the network traffic event, and apply noise to the feature set to produce a noised feature set and produce a reduced noise feature set by processing the noised feature set using a neural network trained to remove noise. The electronic processor is further configured to compare the reduced noise feature set to the feature set to determine a success score and determine whether the success score exceeds a threshold. Responsive to determining that the success score does not exceed the threshold, the electronic processor is further configured to label the network traffic event as anomalous.

21 Claims, 6 Drawing Sheets

(56) References Cited

U.S. PATENT DOCUMENTS

2018/0234302 A1    8/2018   James et al.
2019/0098034 A1*   3/2019   Wakasugi ................ G06N 3/08
2020/0387797 A1   12/2020   Ryan et al.
2021/0049452 A1    2/2021   Fan et al.
2022/0300791 A1*   9/2022   DeLaRosa ............. G06N 3/045

OTHER PUBLICATIONS

Sohl-Dickenstein et al., "Deep Unsupervised Learning using Nonequilibrium Thermodynamics," (2015) arXiv:1503.03585.
Dhariwal et al., "Diffusion Models Beat GANs on Image Synthesis," (2021) arXiv:2105.05233.
Ho et al., "Denoising Diffusion Probabilistic Models," (2020) arXiv:2006.11239.

* cited by examiner

AUTOMATED DETECTION OF NETWORK SECURITY ANOMALIES USING A DENOISING DIFFUSION PROBABILISTIC MODEL

BACKGROUND OF THE INVENTION

Public safety agencies and corporate enterprises increasingly rely on network and software systems infrastructure. Officers and other employees use, among other things, mobile electronic devices to remotely access mission critical software applications and other services. Remote access capability is necessary for the agencies and enterprises to effectively operate. However, opening a network to remote access can open the network to potential misuse by malicious parties. Such misuse can result in data breaches, communications breakdowns, reduced system performance, and other problems. Consequently, network and software systems infrastructure is secured by using, for example, access control policies, encryption, firewalls, network segmentation, anti-virus software, and the like. In addition, Intrusion detection systems (IDS) are vital for protecting public safety and corporate infrastructure.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
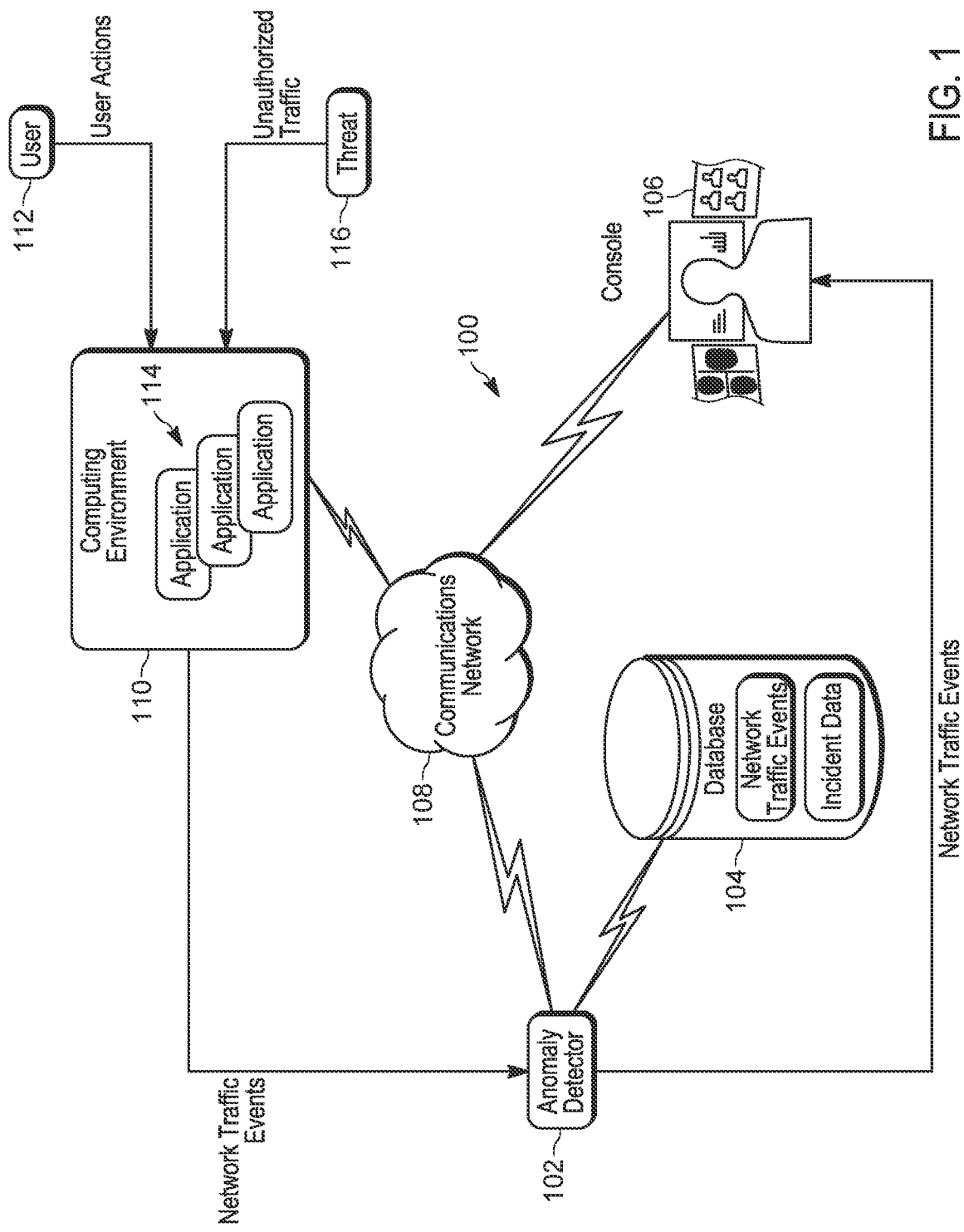
FIG. 1 is a block diagram of a network security anomaly detection system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Complex computing environments are vital tools used by public safety agencies and other public and private sector entities. For example, a police department may use software and other computing technology to, among other things, plan its patrol and other operations, provide communications to first responders and other personnel, receive incident reports from the public, dispatch and coordinate incident response, perform incident investigation, catalog evidence and other records, provide video security and access control systems, and evaluate agency effectiveness. Corporate entities similarly rely on network and computing infrastructure to perform or aid in the performance of many or all aspects of their business operations.

Such computing environments, including cloud-based computing environments, interconnect a myriad of stationary and portable computing devices to provide software applications and other services to personnel operating remotely. For example, in a public safety agency, each employee may carry and operate at least one portable computing device, such as a smart phone, which authenticates to the computing environment to provide its user with access, applications, and services. Each of these devices connects with and exchanges data with numerous other devices and services within the computing environment. Large amounts of network traffic and data are generated through these interactions.

To secure these computing environments, operating entities use security operation centers (SOCs) to monitor the operations of the computing environments. However, it is impractical, if not impossible, for human SOC analysts to evaluate the millions of network traffic events generated by the complex computing environments used to support government and corporate entities. As a result, SOCs use a mixture of manual and automated monitoring of the computing environments. Automated monitoring includes the use of intrusion detection systems (IDSs) to analyze network traffic and data to detect security events that represent a threat to the computing environment.

One current approach is to use a rule-based detection system, which compares network traffic to a set of rules. Network traffic that does not follow the set of rules is flagged as a security event. Rules-based approaches require network operators to program each specific security rule individually. This requires a lot of effort to implement, results in a bloated code base, and can lead to cascading dependencies when rules break. Rules-based systems can generate an unmanageable number of false positives (that is, alerts that require attention but are not actual security threats), leading to alert fatigue for security analysts. Rules-based systems can also generate a large volume of false negatives (that is, security events that go by undetected because they are not accounted for in a rule). False negatives result in threats causing damage to systems before they are detected.

Context for a flagged security event allows for prioritizing events to efficiently deploy resources and aids security analysts in their investigation of the event. However, rule-based systems may not provide an evaluation of how likely it is that a flagged event is a security anomaly, or reasoning for why an event is flagged beyond the fact that a rule was triggered.

To address the problems of rule based systems, machine learning (for example, deep neural networks) may be used to analyze network events to detect and flag security events. However, a deep network architecture, unlike a rule based approach, is essentially a black box. A network event is either flagged or not. There is no way to interpret or explain the output and the layers of decision-making. As noted, this poses issues for security analysts looking to resolve the underlying security issues in the computing environments.

Current IDS approaches create a trade-off between explainability and accuracy. A less accurate rules-based model may produce more false positives but will provide some context for why it detected a security event (for example, indicating which rule was triggered). A more complex machine learning model can provide far more accurate detection of security events but does so at the expense of explainability.

To address, among other things, the foregoing problems, systems and methods are provided herein for automatically detecting and scoring network anomalies. Among other things, embodiments described herein provide a modified denoising diffusion probabilistic model (DDPM) to detect and score network anomalies for one or more computing environments by analyzing network traffic events experienced by the computing environments. Embodiments presented herein use a DDPM modified to accept and process one-dimensional data using a multilayer perceptron to generate normalized losses for a network event using the reconstruction loss for the network event. The modified DDPM is trained using historical and non-anomalous network events for a computing environment. Noise (for example, Gaussian noise) is added to the network event data and the DDPM is taught how to remove the noise.

Embodiments presented herein analyze network events by adding noise to a network event to be analyzed and providing the noised network event to the DDPM, which attempts to reconstruct the network event by removing the noise. The DDPM compares its ability to reconstruct the network events it has seen before to its ability to reconstruct the network event under analysis. The normalized loss indicates how anomalous the network event under analysis is compared to expected network events for the computing environment. Unlike current systems, which are trained to recognize particular types of security events, an IDS operating according to embodiments described herein is able to detect never before seen types of security events.

Some embodiments improve explainability by further processing network events using a simpler anomaly detection algorithm (for example, a Cluster-based Local Outlier Factor (CBLOF), a Histogram-based Outlier Scoring (HBOS) or a similar algorithm). For each feature of a network event under analysis, the algorithm determines the distance of the feature from a population mean or cluster. Using such embodiments, security events are detected and justification for the detection is provided.

Embodiments presented herein provide intrusion detection systems with reduced false negative and positive indications, which in turn reduces the misuse of resources and leads to more efficient use of the monitored computing environment.

One example embodiment provides system for automatically detecting and scoring security anomalies in a computing environment. The system includes a communication interface and an electronic processor communicatively coupled to the communication interface. The electronic processor is configured to receive, via the communication interface, a network traffic event for the computing environment and parse the network traffic event to extract a feature set describing the network traffic event. The electronic processor is further configured to apply noise to the feature set to produce a noised feature set and produce a reduced noise feature set by processing the noised feature set using a neural network trained to remove noise. The electronic processor is further configured to compare the reduced noise feature set to the feature set to determine a success score and determine whether the success score exceeds a threshold. Responsive to determining that the success score does not exceed the threshold, the electronic processor is further configured to label the network traffic event as anomalous.

Another example embodiment provides a method for automatically detecting and scoring security anomalies in a computing environment. The method includes receiving a network traffic event for the computing environment. The method further includes parsing, with an electronic processor, the network traffic event to extract a feature set describing the network traffic event. The method also includes applying, with the electronic processor, noise to the feature set to produce a noised feature set. The method further includes producing a reduced noise feature set by processing the noised feature set using a neural network trained to remove noise. The method further includes comparing, with the electronic processor, the reduced noise feature set to the feature set to determine a success score. The method also includes determining whether the success score exceeds a threshold. Responsive to determining that the success score does not exceed the threshold, the method further includes labeling the network traffic event as anomalous.

As noted, embodiments of the present disclosure are directed to, among other things, methods and systems for automatically detecting and scoring anomalies relating to network security by analyzing network events. Although many of the examples presented herein are described in terms of computing environments, the configurations disclosed herein can be implemented in a number of ways and in varying applications. More particularly, the techniques and systems described herein can be applied to a variety of computing environments that experience anomalies and that are capable of being monitored, for example, as a consequence of being run on platforms, devices, or networks that may be accessed and monitored or that may provide telemetry data that may be accessed and analyzed according to the methods described herein.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. For example, it should be understood that although the systems herein depict components as logically separate, such depictions are merely for illustrative purposes. In some embodiments, the illustrated components may be combined or divided into separate software, firmware and/or hardware. These components may be executed on the same computing device or may be distributed among different computing devices connected by one or more networks or other suitable communication connections.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 illustrates an example system 100 for automatically detecting and scoring security anomalies in computing environments. The system 100 includes an anomaly detector 102, a database 104, and a console 106. The anomaly detector 102, database 104, the console 106, and other illustrated components are communicatively coupled via a communications network 108 to a computing environment 110. The communications network 108 may be implemented using wired or wireless communication components and may include various networks, for example, a wide area network, such as the Internet, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, a local area network (for example a Wi-Fi™ network), and combinations or derivatives thereof.

Figure 2:
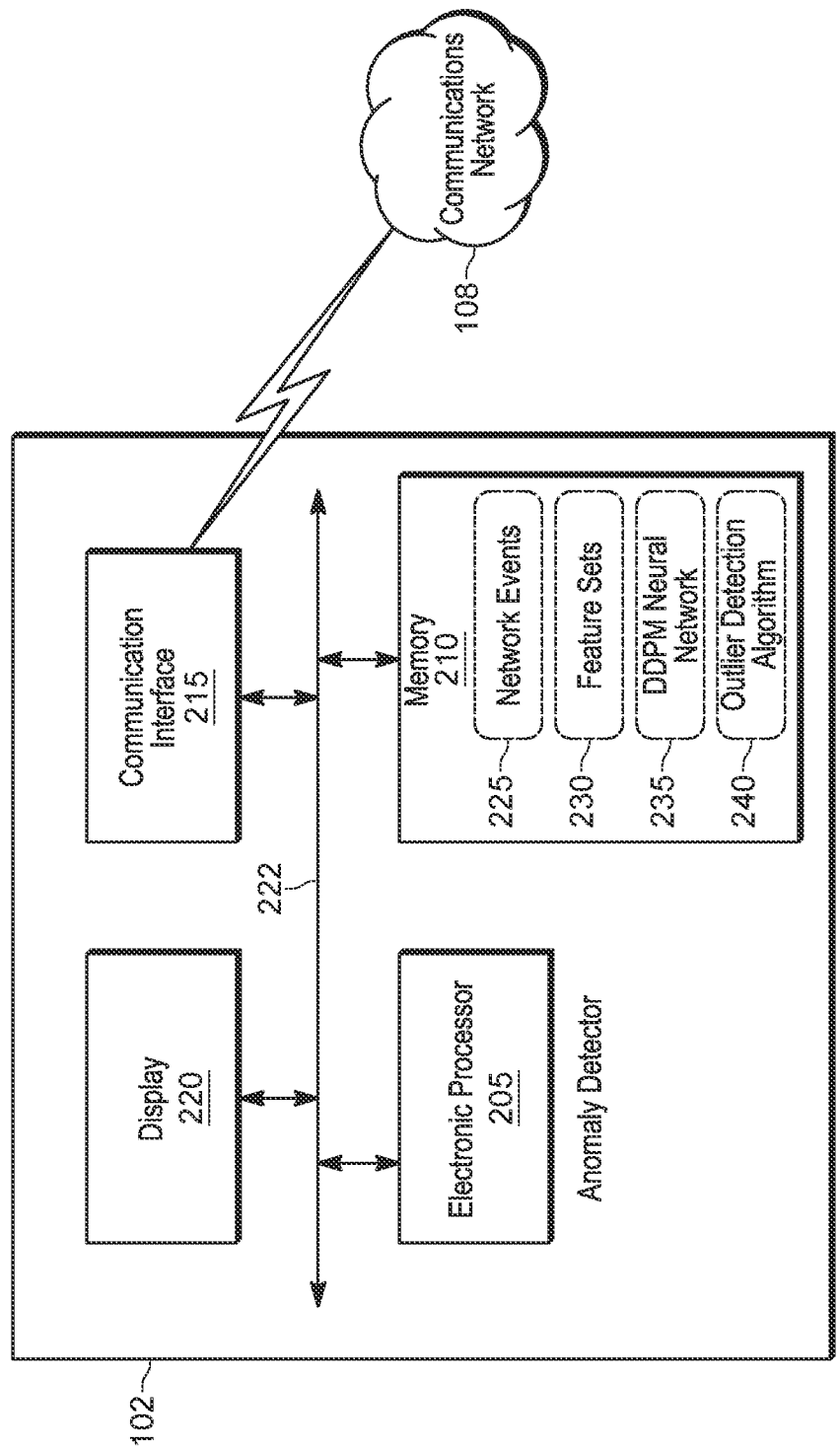
FIG. 2 schematically illustrates an anomaly detector included in the system of FIG. 1 in accordance with some embodiments.

As described in detail herein, the anomaly detector 102, described more particularly with respect to FIG. 2, the database 104, and the console 106 electronically exchange commands and data (for example, via the communications network 108) and operate to automatically detect and score network security anomalies, for example, in the computing environment 110. In some embodiments, the system 100 is part of a security operations center (SOC) that, among other things, provides threat and intrusion detection services for the owners, operators, or users of the computing environment 110.

As illustrated in FIG. 1, to implement the methods described herein, the anomaly detector 102 may communicate with the database 104. The database 104 may be a database housed on a suitable database server communicatively coupled to and accessible by the anomaly detector 102. In alternative embodiments, the database 104 is part of a cloud-based database system external to the system 100 and accessible by the anomaly detector 102 over one or more networks. Also, in some embodiments, all or part of the database 104 is locally stored on the anomaly detector 102 (for example, within the memory 210).

In some embodiments, as illustrated in FIG. 1, the database 104 stores network traffic event data and incident data. Network traffic event data includes network data produced by network traffic events, as described herein. Network traffic event data may also include labels and other metadata assigned to network traffic events by the anomaly detector 102. Incident data includes data for documenting the reporting, analyzing, scoring, and resolution of network incidents. In some embodiments, the incident data is part of an SOC software suite. It should be understood that, in some embodiments, the data stored in the database 104 is distributed among multiple databases that communicate with the anomaly detector 102.

The console 106 is a computer terminal operated by an operator. In some embodiments, the console 106 is a terminal for a security operations center and is operated by systems analyst, engineer, or other technical personnel. In some embodiments, the console 106 is a computer that includes an electronic processor (for example, a microprocessor, or other electronic controller), a memory, a network interface, and other various modules coupled directly, by one or more control or data buses, or a combination thereof. The memory may include read-only memory, random access memory, other non-transitory computer-readable media, or a combination thereof. In one example, the electronic processor is configured to retrieve instructions and data from the memory and execute, for example, functions as described herein. The console 106 sends and receives data over the communications network 108 using the network interface. While the console 106 is described herein with reference to a single operator, in some embodiments, the console 106 includes a plurality of consoles 106 that are each operated by one or more operators.

The computing environment 110 operates to provide users (for example, the user 112) with the applications 114 and other computing services. In some embodiments, the computing environment 110 is operated for or by a public safety agency and may securely provide, for example, applications for communications, computer aided dispatch, incident management, crime analysis and investigation, video security and access control systems, records and evidence management, and the like. In some embodiments, the computing environment 110 is operated by an enterprise to provide various business-related software applications and services to hundreds or thousands of employees in a secure manner. In some embodiments, some of all of the computing environment 110 is operated for a contracting agency or enterprise by a service provider and contains dedicated software environments (for example, virtual servers), which are secured from one another and accessible only by their respective authorized groups of users. In some embodiments, the computing environment 110 may include multiple software environments for serving tens, hundreds, or thousands of users across multiple agencies, enterprises, or both. In some embodiments, the computing environment 110 includes components in multiple geographically-distributed data centers.

The computing environment 110 includes client computing devices, which access one or more of the applications 114, which are provided by on one or more serving computing devices. Users (for example, the user 112) access the applications 114 (and other services of the computing environment 110) via client devices from within the computing environment 110, from outside the computing environment 110 (for example, using a VPN or other encrypted session), or both. Client computing devices include personal computers, portable communication devices (for example, a mobile phone or a tablet), or other electronic computing devices that can transmit and receive data to and from the computing environment 110. The computing environment 110 may interconnect its computing devices via many different types of networks, such as, for example, those described above with respect to the communications network 108, to facilitate communication between the devices of the computing environment 110.

As users (for example, the user 112) interact with the applications 114 and other devices and services of the computing environment 110, the interactions generate network traffic events. Similarly, automated interactions among and between the applications 114 and other computing devices within and without the computing environment 110 also generate network traffic events.

A network traffic event includes a packet or series of packets making up a network transaction or attempted transaction between two computing devices via a network of the computing environment 110. For example, a network traffic event may be a login session or and attempted login session between the user 112 and one of the applications

114. In another example, a network traffic event may be the transmission of a command (for example, a control command) or data to or from the user 112 and one of the applications 114. Network traffic events are characterized by a set of features, which may include a source address for the network traffic event, a destination address for the network traffic event, an application type for the network traffic event, a payload size for the network traffic event, and a timestamp for the network traffic event.

Most network traffic events present in the computing environment 110 are normal for the computing environment 110. By normal, it is meant that a network traffic event is authorized and expected (that is, produced by usual and legitimate activities of authorized users of the computing environment 110). However, some network traffic events may be anomalous in nature (for example, unauthorized traffic from a threat 116). An anomalous network event (also referred to herein as a "security event," an "anomaly" or a "network security anomaly") is one that is actually or potentially harmful to elements of the computing environment 110 (whether intentional or not). For example, an anomalous network traffic event may disable or deny or slow down access to applications or services; allow unauthorized access to otherwise secure applications, services, or data; destroys otherwise secure data; or otherwise degrade user experience, system performance, or both.

Examples of anomalous network events include malicious interference, hacking, computer worms or viruses, deliberate attempts to overload a system, broadcast attacks, or other interne attacks. Other examples include network events that are properly addressed and formatted (that is, according to the correct protocol), and may even be authenticated with valid security credentials, but nevertheless may be harmful. For example, some applications and systems may be compromised by the underlying data of the network traffic event, for example, using a "man-in-the-middle" attack.

As illustrated in FIG. 1, the computing environment 110 provides network traffic events (for example, as copies of network data, duplicate network streams, and the like) to the anomaly detector 102 for analysis as described herein. The anomaly detector 102 may send some network traffic events, for example, those labeled as anomalous, to the console 106 (for example, for display or further analysis).

The anomaly detector 102 is described more particularly with respect to FIG. 2. In the example provided, the anomaly detector 102 includes an electronic processor 205, a memory 210, a communication interface 215, and a display 220. The illustrated components, along with other various modules and components (not shown) are coupled to each other by or through one or more control or data buses (for example, a communication bus 222) that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the communication interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the methods described herein.

The memory 210 can include one or more non-transitory computer-readable media and includes a program storage area and a data storage area. The program storage area and the data storage area can include combinations of different types of memory, as described herein. In the embodiment illustrated, the memory 210 stores, among other things, data relating to network traffic events 225 and feature sets 230 (both described herein). The memory 210 also stores a denoising diffusion probabilistic model (DDPM) neural network 235 and an outlier detection algorithm 240 (both described herein).

The communication interface 215 is configured to receive input and to provide system output. The communication interface 215 obtains information and signals from, and provides information and signals to, (for example, over one or more wired and/or wireless connections) devices both internal and external to the anomaly detector 102. The communication interface 215 may include a wireless transmitter or transceiver for wirelessly communicating over the communications network 108. Alternatively, or in addition to a wireless transmitter or transceiver, the communication interface 215 may include a port for receiving a cable, such as an Ethernet cable, for communicating over the communications network 108 or a dedicated wired connection. In some embodiments, the anomaly detector 102 communicates with other devices through one or more intermediary devices, such as routers, gateways, relays, and the like.

In the embodiment illustrated, the anomaly detector 102 includes a display 220, which is a suitable display such as, for example, a liquid crystal display (LCD) touch screen, or an organic light-emitting diode (OLED) touch screen. In some embodiments, the anomaly detector 102 implements a graphical user interface (GUI) (for example, generated by the electronic processor 205, from instructions and data stored in the memory 210, and presented on the display 220), that enables a user to interact with the anomaly detector 102. In some embodiments, the anomaly detector 102 enables display remotely, for example, using a display (configured similarly to the display 220) of the console 106.

As described more particularly herein, the anomaly detector 102 uses machine learning (in one example, the DDPM neural network 235 and the outlier detection algorithm 240) to analyze network traffic events to detect and score network security anomalies. Machine learning generally refers to the ability of a computer program to learn without being explicitly programmed. In some embodiments, a computer program (sometimes referred to as a learning engine) is configured to construct a model (for example, one or more algorithms) based on example inputs. Supervised learning involves presenting a computer program with example inputs and their desired (actual) outputs. The computer program is configured to learn a general rule (a model) that maps the inputs to the outputs in the training data. Machine learning may be performed using various types of methods and mechanisms. Example methods and mechanisms include decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using some or all of these approaches, a computer program may ingest, parse, and understand data and progressively refine models for data analytics, including image analytics. Once trained, the computer system may be referred to as an intelligent system, an artificial intelligence (AI) system, a cognitive system, or the like.

Figure 3:
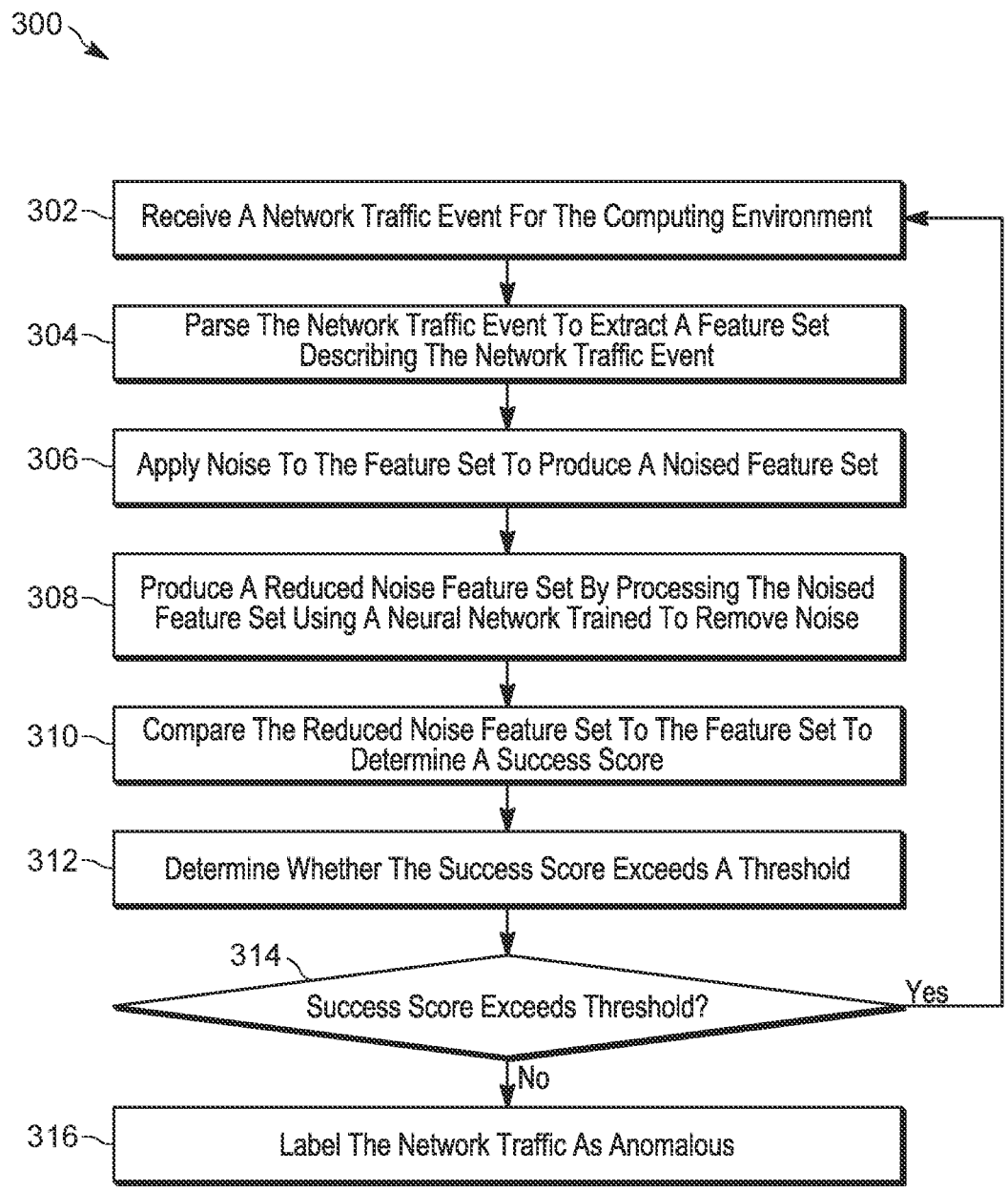
FIG. 3 is a flowchart of a method for detecting security anomalies in a computing environment in accordance with some embodiments.

FIG. 3 illustrates an example method 300 for automatically detecting and scoring security anomalies in a computing environment. The method 300 is described as being performed by the system 100, and, in particular, the anomaly detector 102 and the electronic processor 205. However, it should be understood that in some embodiments, portions of the method 300 may be performed by other devices, including for example, the console 106. As an example, the method 300 is described in terms of the anomaly detector 102 operating to monitor the computing environment 110 for anomalies. However, it should be understood that embodiments of the method 300 may be used with multiple computing environments, arranged in various combinations. It should also be understood that embodiments of the method 300 may be used by embodiments of the system 100 that include more than one anomaly detector 102, database 104, or console 106.

At block 302, the electronic processor 205 receives (for example, via the communication interface 215) a network traffic event for the computing environment 110. In some embodiments, the computing environment 110 (that is, a device thereof) sends a continuous stream of network traffic events to the anomaly detector 102. In some embodiments, the computing environment 110 sends a representative sampling of network traffic events periodically. In some embodiments, the anomaly detector 102 includes or is in communication with a packet sniffer coupled to the computing environment and configured to gather network traffic events for analysis. In some embodiments, the computing environment 110 is configured to log network traffic events to the database 104 or another database accessible by the anomaly detector 102.

At block 304, the electronic processor 205 parses the network traffic event to extract a feature set describing the network traffic event. For example, the electronic processor 205 may decode packets for the network traffic event to extract values for the fields of the packets. Features are characteristics of the network traffic event, including for example, a source address for the network traffic event, a destination address for the network traffic event, an application type for the network traffic event, a payload size for the network traffic event, a payload type for the network traffic event, and a timestamp for the network traffic event.

At block 306, the electronic processor 205 applies noise to the feature set to produce a noised feature set. For example, the electronic processor 205 may corrupt or scramble some of the data in the feature set or add additional data to the feature set. In some embodiments, the electronic processor 205 applies noise to the feature set using a Gaussian distribution.

Figure 4:
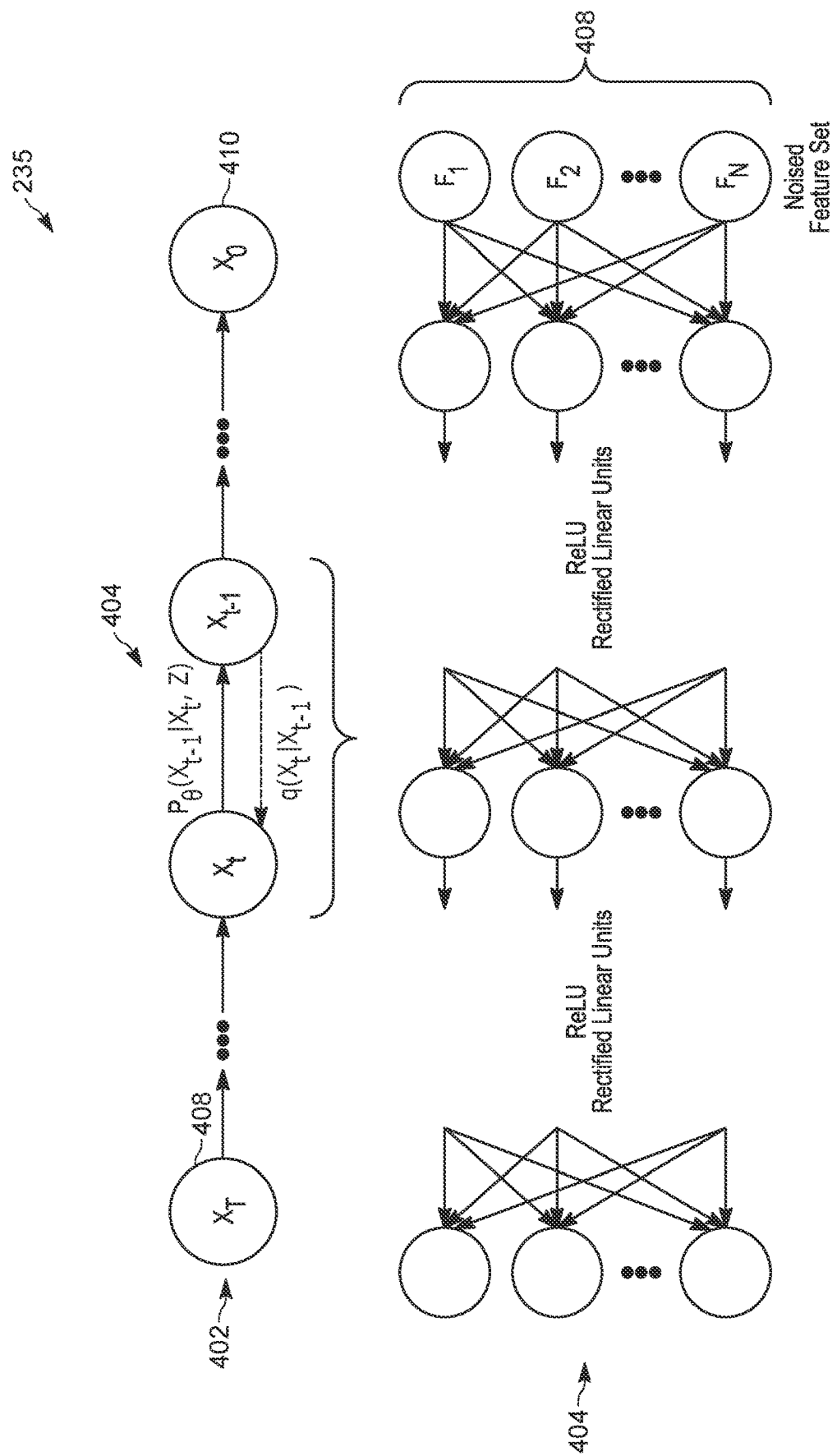
FIG. 4 illustrates aspects of the operation of a neural network executed by the system of FIG. 1 in accordance with some embodiments.

At block 308, the electronic processor 205 produces a reduced noise feature set by processing the noised feature set using a neural network trained to remove noise from network traffic event data. In some embodiments, the electronic processor 205 uses the DDPM neural network 235 to produce the reduced noise feature set. As illustrated in FIG. 4, the DDPM neural network 235 is a neural network that includes a denoising diffusion probabilistic model 402.

Instead of the convolutional neural network typically found in DDPM implementations used for image detection (for example, the U-Net (a convolutional neural network created at the University of Freiburg)), the DDPM neural network 235 includes a multilayer perceptron 404. The initial input $X_T$ to the DDPM neural network 235 is the noised feature set 408 (generated at block 306). As illustrated in FIG. 4, the multilayer perceptron 404 is represented by the function $P_\theta(x_{t-1}|x_t, z)$ where $x_t$ is the current noised feature set being processed, $x_{t-1}$ is the result of the previous attempt by the DDPM to remove the noise, and z is the number of iterations being performed. The multilayer perceptron 404 includes rectified linear units (ReLU) between fully connected layers. The output 410 ($X_0$) is the result of the DDPM's attempt (after a number of iterations z) at removing the added noise to produce the original feature set (extracted at block 304).

Returning to FIG. 3, at block 310, the electronic processor 205 compares the reduced noise feature set to the feature set to determine a success score. The success score is a numeric value representing the measure of how successful the DDPM neural network 235 was at removing the noise from the noised feature set. In some embodiments, the success score is a percentage. More broadly, the success score may be viewed as an evaluation or assessment of how much noise is removed from the noised feature set. For example, when the DDPM neural network 235 removes all of the noise from the noised feature set (that is, the reduced noise feature set produced at block 308 is identical to the feature set extracted at block 304), the success score is 100%. As described herein, the neural network is trained to remove noise using network traffic events normal for the computing environment being monitored. If the success score is 100%, that indicates that the neural network has seen this type of network event before because it was part of the training data and it is therefore not a security threat. Accordingly, the lower the success score, the less likely it is that the neural network has seen this type of network event before, and the more likely it is that the network event is security threat.

As described above and illustrated in FIG. 5, in some embodiments, the electronic processor 205 performs multiple iterations of block 308 to successively remove noise. In some embodiments, the number of iterations is pre-determined and may be, for example, identical to the number of iterations used during the training of the neural network. In such embodiments, the result of the multiple iterations is used to determine the success score.

In some embodiments, the electronic processor 205 compares the reduced noise feature set to the feature set to determine a raw success score and normalizes the raw success score to determine the success score. For example, the electronic processor 205 may normalize the raw success score based on the results produced with the training data used to train the neural network. The normalized success score indicates how anomalous the network event under analysis is compared to expected network events for the computing environment.

At block 312, the electronic processor 205 determines whether the success score exceeds a threshold. The threshold is a numeric value representing an acceptable likelihood that the network traffic event under consideration represents normal network traffic for the computing environment and is therefore not anomalous (e.g., a security threat). For example, a threshold set at 80% would indicate that a network traffic event is not anomalous to the computing environment when the neural network is able to remove 80% of the noise form a noised feature set generated from that network traffic event.

At block 316, responsive to determining that the success score does not exceed the threshold (at block 314), the electronic processor 205 labels the network traffic event as anomalous. For example, the electronic processor 205 may store the network traffic event in a memory with an associated label indicating that it is an anomalous network traffic event for the computing environment that generated it. In some embodiments, the electronic processor 205, responsive to determining that the success score does not exceed the threshold, performs a mitigation action. For example, the electronic processor 205 may generate an incident management system log entry by making an entry in the database 104. In another example, the electronic processor 205 may transmit an electronic message (for example, using an API or a suitable electronic protocol) to an analyst (for example, an SOC analyst). In another example, the electronic processor 205 may transmit an electronic configuration command based on the feature set to a network device. For example, the electronic processor 205 may instruct a firewall or other security device to block network packets matching certain features in the feature set for the anomalous network event (for example, blocking packets from the source address). In another example, the electronic processor 205 may display an alert on a graphical user interface (for example, presented on the display 220 or a display of the console 106.

Figure 5:
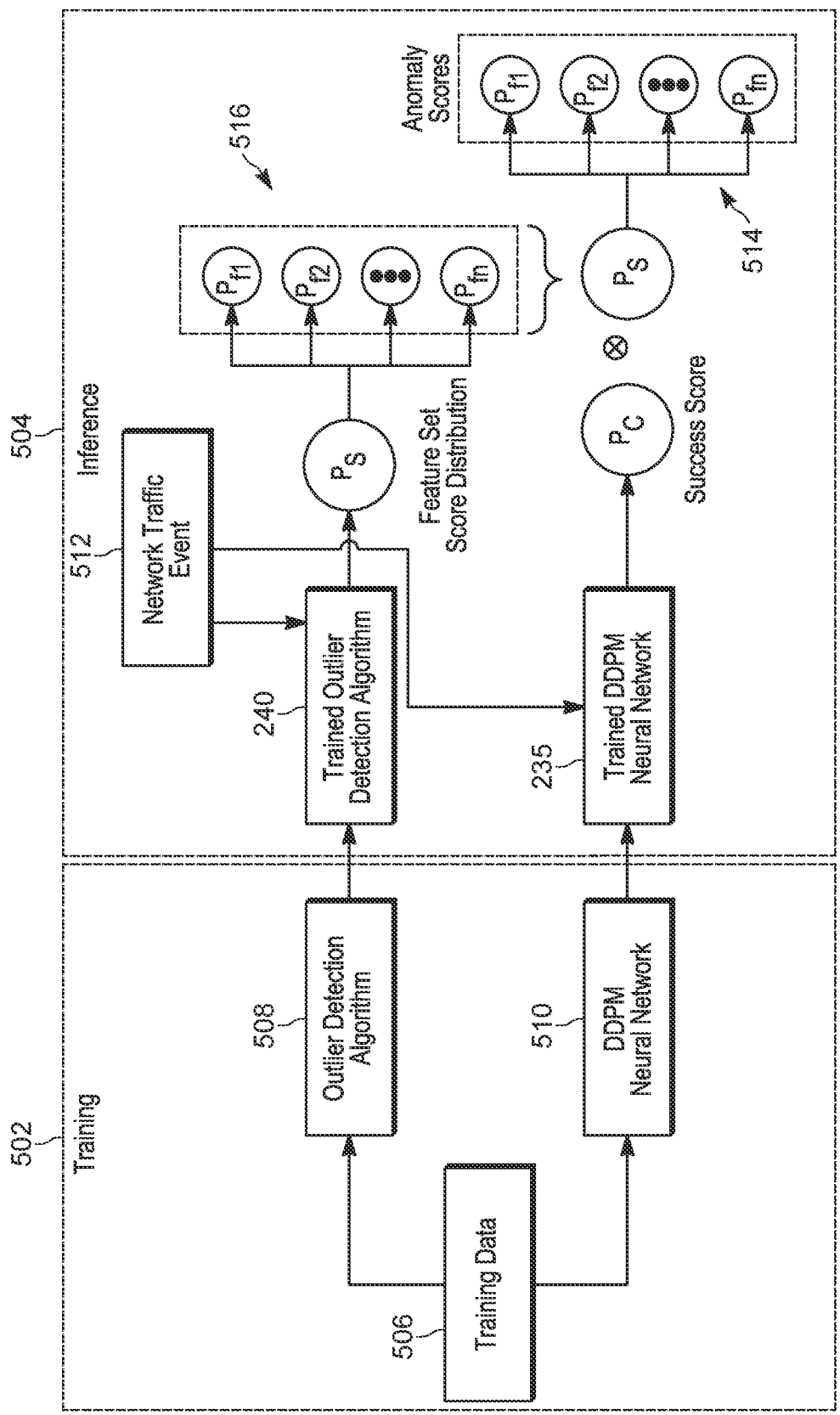
FIG. 5 is a block diagram illustrating aspects of the operation of the system of FIG. 1 in accordance with some embodiments.

In some embodiments, responsive to determining that the success score does not exceed the threshold (at block 312), the electronic processor 205 further analyzes the feature set with an outlier detection algorithm. For example, as illustrated in FIG. 5, during a training phase 502 (described in part with respect to FIG. 6), training data 506 is used to train both an initial untrained DDPM neural network 510 (to produce the trained DDPM neural network 235 illustrated in FIG. 4 and described herein) and an untrained outlier detection algorithm 508 (to produce the outlier detection algorithm 240). The outlier detection algorithm may be, for example, a Cluster-based Local Outlier Factor (CBLOF), a Histogram-based Outlier Scoring (HBOS), or a similar algorithm.

As illustrated in FIG. 5, in some embodiments, during the inference phase 504, the trained outlier detection algorithm 240 and the DDPM neural network 235 are used in conjunction to detect and score network security anomalies. In the example illustrated, a network traffic event 512 is being analyzed. If, for example, the electronic processor 205 determines that the success score for the feature set extracted from the network traffic event 512 does not exceed the threshold (at block 314), then it analyzes the noiseless originally extracted feature set with the outlier detection algorithm 240 to generate a plurality of anomaly scores 514. As illustrated in FIG. 5, the outlier detection algorithm 240 processes the feature set to produce a feature set score distribution 516. For each feature of the feature set, the outlier detection algorithm 240 determines the distance of the feature from a population mean or cluster. The feature set distribution is combined with the success score to produce a set of anomaly scores, each associated with an individual feature of the feature set. The anomaly scores provide a breakdown of how anomalous each feature of the network traffic event is. The electronic processor 205 labels the network traffic event as anomalous based on the plurality of anomaly scores. This labeling provides SOC analysts a starting point for their investigation of the network security event.

Returning to FIG. 3, in some embodiments, when the electronic processor 205 determines that the success score exceeds the threshold (at block 314), the method 300 continues (at block 302) to analyze additional network traffic events.

Figure 6:
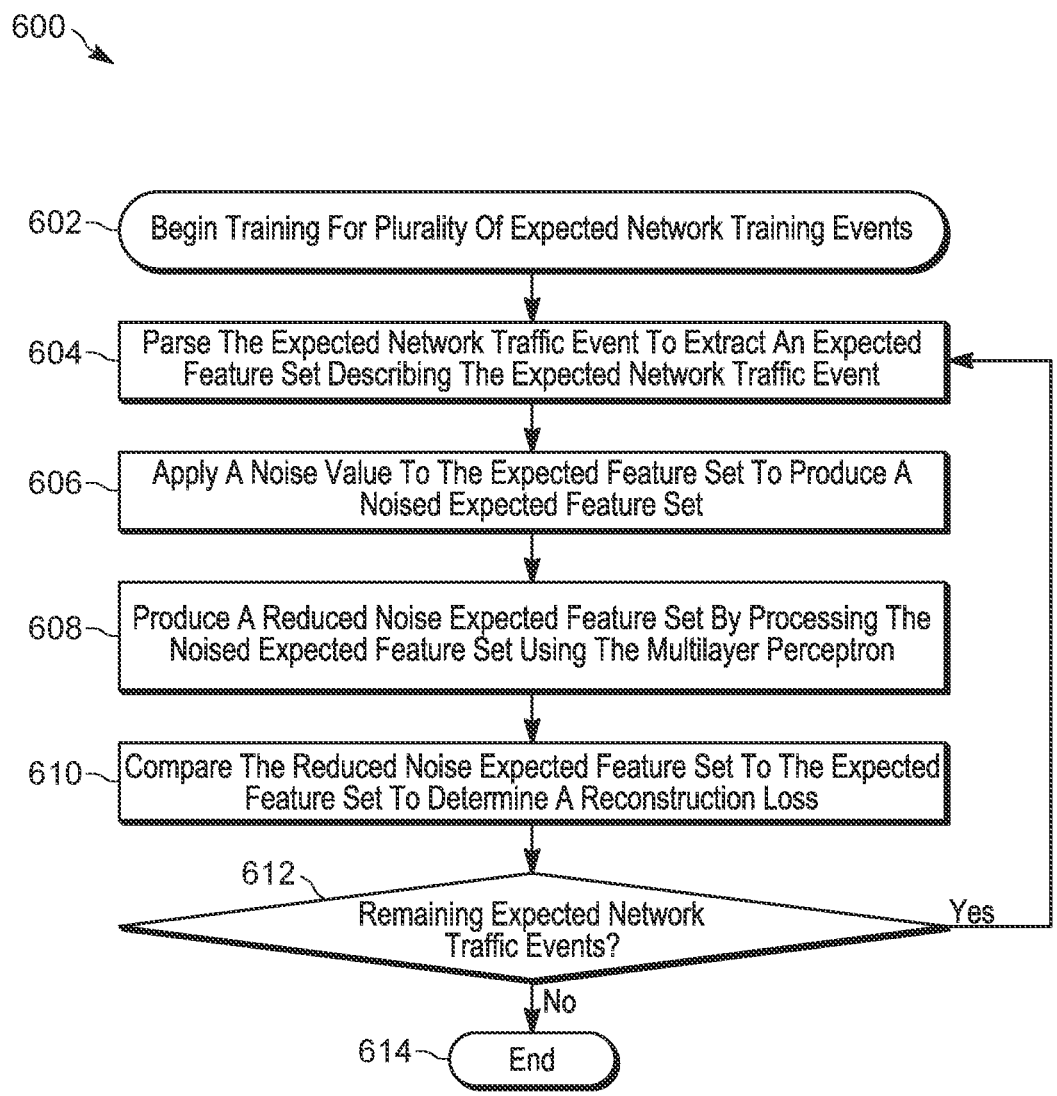
FIG. 6 is a flowchart of a method for training a neural network executed by the system of FIG. 1 in accordance with some embodiments.

As noted, the DDPM neural network is trained to remove noise. FIG. 6 illustrates an example method 600 for training the neural network to remove noise. The method 600 is described as being performed by the system 100, and, in particular, the anomaly detector 102 and the electronic processor 205. However, it should be understood that in some embodiments, portions or all of the method 600 may be performed by other devices.

At block 602, the method 600 begins training with a plurality of expected network traffic events representing a distribution of traffic for the network. For example, the plurality of expected network traffic events may be a historical network log, scrubbed of any anomalous network traffic events (for example, using a rules-based approach). In another example, the plurality of expected network traffic events may be curated by one or more SOC analysts to represent a desired distribution of traffic for the network. In any case, the plurality of expected network traffic events is used as training data for the neural network because it represents non-anomalous network traffic.

At block 604, the electronic processor 205 parses the first expected network traffic event of the plurality of expected network traffic events to extract an expected feature set describing the expected network traffic event, for example, as described above with respect to block 304 of FIG. 3.

At block 606, the electronic processor 205 applies a noise value to the expected feature set to produce a noised expected feature set, for example, as described above with respect to block 306 of FIG. 3.

At block 608, the electronic processor 205 produces a reduced noise expected feature set by processing the noised expected feature set using the multilayer perceptron (for example, as illustrated in FIG. 4). During this step, the electronic processor 205 attempts to remove the noise applied at block 606.

At block 610, the electronic processor 205 compares the reduced noise expected feature set to the expected feature set to determine a reconstruction loss. The reconstruction loss is a numeric value indicative of the neural network's success at removing the noise, similar to the success score described above with respect to FIG. 3. The higher the success, the lower the reconstruction loss.

In some embodiments, the electronic processor 205 iterates (e.g., repeats) blocks 604-610, performing a quantity of successive passes for each expected network event. For each successive pass, the noise value for the added noise is higher than the noise value of the previous pass. In so doing, the neural network progressively improves its ability to remove noise from the expected network traffic event.

At block 612, when there are remaining expected network events to process, the method 600 continues processing the plurality of expected network traffic events (at block 604).

At block 612, when there are no remaining expected network events to process, the method 600 ends at block 614.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for detecting security anomalies in a computing environment, the system including:
    a communication interface;
    an electronic processor communicatively coupled to the communication interface and configured to:
    receive, via the communication interface, a network traffic event for the computing environment;
    parse the network traffic event to extract a feature set describing the network traffic event;
    apply noise to the feature set to produce a noised feature set;
    produce a reduced noise feature set by processing the noised feature set using a neural network trained to remove noise;
    compare the reduced noise feature set to the feature set to determine a success score;
    determine whether the success score exceeds a threshold; and
    responsive to determining that the success score does not exceed the threshold, label the network traffic event as anomalous.

2. The system of claim 1, wherein the electronic processor is configured to:
    produce a second reduced noise feature set by processing the reduced noised feature set using the neural network trained to remove noise;
    determine the success score by comparing the second reduced noise feature set to the feature set.

3. The system of claim 1, wherein the electronic processor is configured to:
    compare the reduced noise feature set to the feature set to determine a raw success score; and
    normalize the raw success score to determine the success score.

4. The system of claim 1, wherein the neural network includes a denoising diffusion probabilistic model including a multilayer perceptron.

5. The system of claim 4, wherein the electronic processor is configured to train the neural network to remove noise by, for each of a plurality of expected network traffic events representing a distribution of traffic for the network:
    (a) parsing the expected network traffic event to extract an expected feature set describing the expected network traffic event;
    (b) applying a noise value to the expected feature set to produce a noised expected feature set;
    (c) producing a reduced noise expected feature set by processing the noised expected feature set using the multilayer perceptron; and
    (d) comparing the reduced noise expected feature set to the expected feature set to determine a reconstruction loss.

6. The system of claim 5, wherein the electronic processor is configured to, for each of a plurality of expected network traffic events:
repeat steps (a)-(d) for a quantity of passes,
wherein for each pass of the quantity of passes, the noise value is higher than the noise value of the previous pass.

7. The system of claim 1, wherein the electronic processor is configured to, responsive to determining that the success score does not exceed the threshold,
analyze the feature set with an outlier detection algorithm to generate a plurality of anomaly scores, each of the anomaly scores associated with an individual feature of the feature set; and
label the network traffic event as anomalous based on the plurality of anomaly scores.

8. The system of claim 1, wherein the feature set includes at least one selected from the group consisting of a source address for the network traffic event, a destination address for the network traffic event, an application type for the network traffic event, a payload size for the network traffic event, a payload type for the network traffic event, and a timestamp for the network traffic event.

9. The system of claim 1, wherein the electronic processor is configured to, responsive to determining that the success score does not exceed the threshold, perform a mitigation action including at least one selected from the group consisting of generating an incident management system log entry, transmitting an electronic message to an analyst, transmitting an electronic configuration command based on the feature set to a network device, and displaying an alert on a graphical user interface.

10. The system of claim 1, wherein the electronic processor is configured to apply noise to the feature set using a Gaussian distribution.

11. A method for detecting and scoring security anomalies in a computing environment, the method including:
receiving a network traffic event for the computing environment;
parsing, with an electronic processor, the network traffic event to extract a feature set describing the network traffic event;
applying, with the electronic processor, noise to the feature set to produce a noised feature set;
producing a reduced noise feature set by processing the noised feature set using a neural network trained to remove noise;
comparing, with the electronic processor, the reduced noise feature set to the feature set to determine a success score;
determining whether the success score exceeds a threshold; and
responsive to determining that the success score does not exceed the threshold, labeling the network traffic event as anomalous.

12. The method of claim 11, further comprising:
producing a second reduced noise feature set by processing the reduced noised feature set using the neural network trained to remove noise;
determine the success score by comparing the second reduced noise feature set to the feature set.

13. The method of claim 11, further comprising:
comparing the reduced noise feature set to the feature set to determine a raw success score; and
normalizing the raw success score to determine the success score.

14. The method of claim 11, wherein producing the reduced noise feature set includes processing the noised feature set using a denoising diffusion probabilistic model including a multilayer perceptron.

15. The method of claim 14, further comprising:
training the neural network to remove noise by, for each of a plurality of expected network traffic events representing a distribution of traffic for the network:
(a) parsing the expected network traffic event to extract an expected feature set describing the expected network traffic event;
(b) applying a noise value to the expected feature set to produce a noised expected feature set;
(c) producing a reduced noise expected feature set by processing the noised expected feature set using the multilayer perceptron; and
(d) comparing the reduced noise expected feature set to the expected feature set to determine a reconstruction loss.

16. The method of claim 15, further comprising:
for each of a plurality of expected network traffic events:
repeating steps (a)-(d) for a quantity of passes,
wherein for each pass of the quantity of passes, the noise value is higher than the noise value of the previous pass.

17. The method of claim 11, further comprising:
responsive to determining that the success score does not exceed the threshold:
analyzing the feature set with an outlier detection algorithm to generate a plurality of anomaly scores, each of the anomaly scores associated with an individual feature of the feature set; and
labeling the network traffic event as anomalous based on the plurality of anomaly scores.

18. The method of claim 11, wherein extracting the feature set includes extracting at least one selected from the group consisting of a source address for the network traffic event, a destination address for the network traffic event, an application type for the network traffic event, a payload size for the network traffic event, a payload type for the network traffic event, and a timestamp for the network traffic event.

19. The method of claim 11, further comprising:
responsive to determining that the success score does not exceed the threshold, performing a mitigation action including at least one selected from the group consisting of generating an incident management system log entry, transmitting an electronic message to an analyst, transmitting an electronic configuration command based on the feature set to a network device, and displaying an alert on a graphical user interface.

20. The method of claim 11, further comprising:
applying noise to the feature set using a Gaussian distribution.

21. A non-transitory computer-readable medium containing executable instructions that, when executed by one or more electronic processors, cause the one or more electronic processors to:
receive, via a communication interface, a network traffic event for a computing environment;
parse the network traffic event to extract a feature set describing the network traffic event;
apply noise to the feature set to produce a noised feature set;
produce a reduced noise feature set by processing the noised feature set using a neural network trained to remove noise;

compare the reduced noise feature set to the feature set to determine a success score;
determine whether the success score exceeds a threshold; and
responsive to determining that the success score does not exceed the threshold, label the network traffic event as anomalous.

\* \* \* \* \*